March 10, 1959  F. DUCATTEAU  2,876,557
APPARATUS FOR TREATMENT OF GRAINS OF CEREALS
Filed June 21, 1956
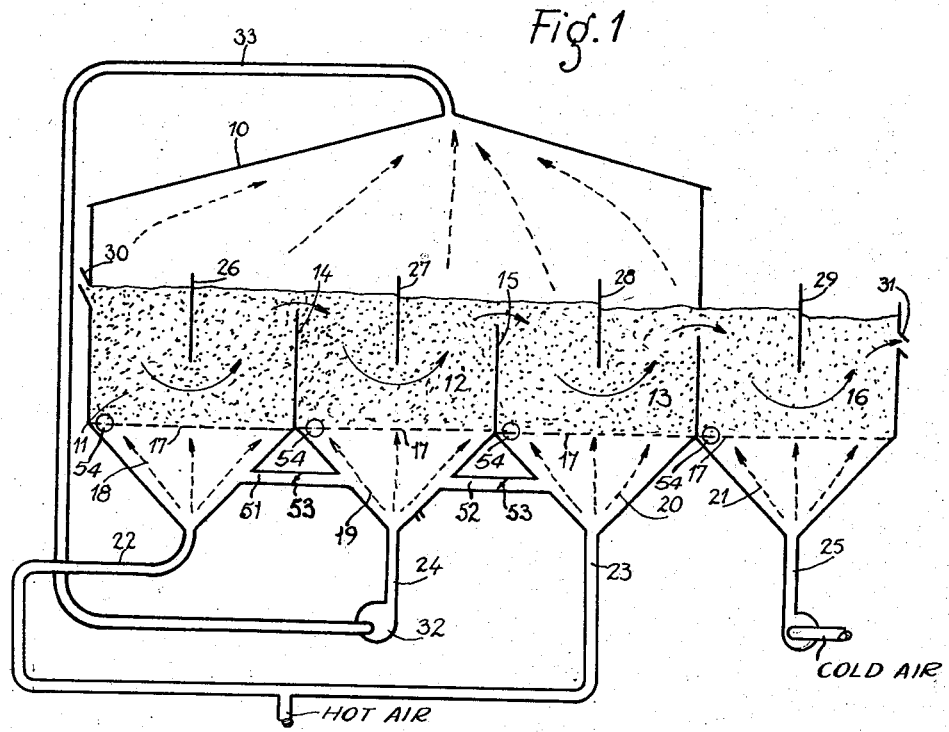
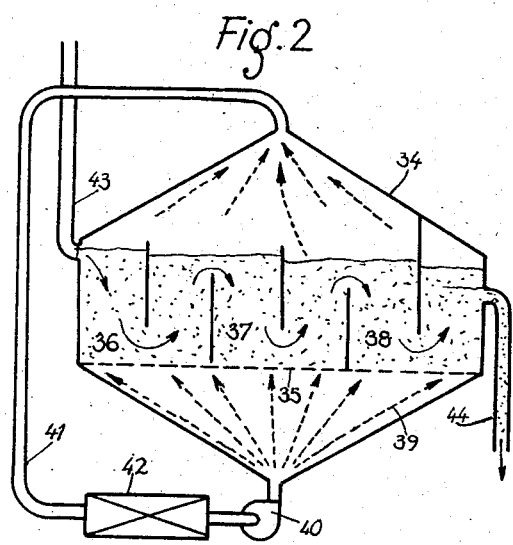
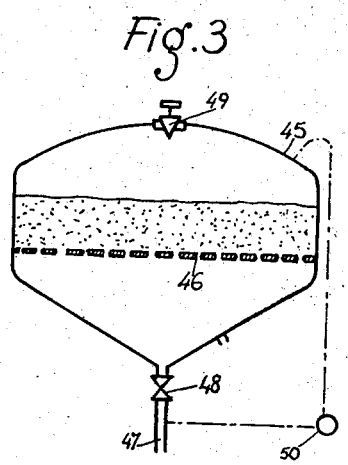
INVENTOR
FRANCIS DUCATTEAU
BY Young, Emery & Thompson
ATTYS.

United States Patent Office 2,876,557
Patented Mar. 10, 1959

2,876,557

APPARATUS FOR TREATMENT OF GRAINS OF CEREALS

Francis Ducatteau, Paris, France

Application June 21, 1956, Serial No. 592,916

Claims priority, application France June 23, 1955

2 Claims. (Cl. 34—57)

The present invention has for its object a method of treatment of grains of cereals: wheat, maize or the like, coffee and in some cases other agricultural products, for their drying, roasting or torrefaction, their sterilisation or their cooking by means of a circulation of hot fluid.

This method is characterised in that the circulation of hot fluid for the said treatment is used to produce fluidisation of the grains being treated.

It is known that the phenomenon of so-called fluidisation of granular or powdered materials consists in subjecting them to the action of a rising current of fluid which is sufficiently strong to cause the said materials to be held in suspension in the fluid. The flow of fluid acts against the force of gravity and separates the particles from each other, thus keeping them in a state of agitation. The mass of granular or powdered materials has then the appearance of a boiling liquid, without however being carried away by the flow of fluid.

This phenomenon known as fluidisation has already been used to advantage for the classification or the treatment of various solid mineral materials such as coals, ores or the like.

The present invention directs its applications to agricultural products, especially in the form of grains, with a particular view to the drying of these products or to similar treatments, such as torrefaction, roasting, sterilisation, cooking, etc.

Treatments of these kinds are generally effected by means of a circulation of air, of hot gases or of vapors through a bed of fixed grains and the speed of circulation of the hot fluids, air or gas, is regulated in such manner as to avoid the mass of grains being set in movement. If an agitation of these grains is desirable, it is carried out by mechanical means specially provided for that purpose.

It has also been proposed to ensure the treatment of agricultural products, grains or the like, in a flow of gas. But the flow is then provided in order to convey the products treated, if necessary by successive leaps, from the point of their admission into the apparatus up to their discharge therefrom (British Patent No. 663,121 of July 14, 1950).

In accordance with a special feature of the invention, there is created on the contrary a circulation of hot fluid such that it systematically produces an agitation of the grains and the "fluidisation" of the mass of these grains. This mass in agitation remains stationary and the grains are not carried away by the fluid.

This fluidisation of the grains with a view to their treatment is effected by a continuous or pulsatory blowing action of the treatment fluid. It may preferably be combined with accessory means which facilitate the setting of the grains into motion, and especially by giving a vibrational movement to the support of the mass of grains.

In order to carry this method into effect, the grains to be treated are laid in the form of a bed on a support constituted by a grid or a perforated plate. The lower part of the support is connected to a source of hot fluid under pressure. This fluid passes through the support in distributed jets and spreads out into the bed of grains thus putting these into agitation. It is during this agitation that the exchange of heat with the grains takes place which effects their drying, roasting, torrefaction, sterilisation or cooking. These various effects may furthermore be combined.

Since during the fluidisation stage, each grain in agitation is swept over the whole of its surface by the hot fluid, there results an improvement in the contact of the grains with the fluid and a greater transmission of heat by convection. The treatment is much more rapid than with the usual process in which the grains remain at every moment in contact with each other, only leaving the external surface of the mass or the interstitial spaces between the grains for the passage of the fluid.

However, since in order to obtain the effect of fluidisation, it is desirable to give the fluid a high speed, the passage of the fluid may be too rapid for all its heat and all its capacity for humidification to be absorbed. There is then an advantage in proceeding to fluidisation with re-cycling, that is to say by bringing back all or part of the heating fluid which passes out of the bed of grains into the blowing circuit.

With a view to obtaining a good efficiency of treatment, the bed of grains is divided into a number of parts into which the heating fluid is brought successively to its various phases of cooling and/or of humidification.

The passage of the grains from one part to the following is in this case effected by the fluidisation itself, the bed of grains behaving as a liquid which can flow or which can be made to overflow.

The heating fluid may be air or gas put into circulation by a fan, previously brought up to a suitable temperature of 100° (for drying) to 200–300° (for cooking or torrefaction). Use can however also be made of saturated or superheated steam for cooking and sterilisation.

When saturated steam is employed, tnis in injected onto the bed of grains to be treated through appropriate orifices formed in the support. There is then produced, during its passage through these orifices, an expansion with partial condensation of the steam. This condensation maintains in tne steam in contact with the grains a humidity which is favourable to the treatment of the grains. This method is preferably employed to carry out the continuous cooking of the grains in certain applications (brewing, alcoholic fermentation, preparation of foodstuffs for animals, etc.).

The invention will now be more fully described with reference to the attached drawings, which show the application of the metnod to various treatments of grains.

Fig. 1 is a diagrammatic view of a drying installation.

Fig. 2 relates to an apparatus for torrefaction.

Fig. 3 is a concerned with an apparatus for cooking.

The installation of Fig. 1 is constituted by a chamber 10 divided into several chambers of which there may be any particular number. These chambers 11, 12, 13 are separated by the partitions 14, 15, an external adjoining chamber 16 being formed after the chamber 13.

Each of the chambers 11, 12, 13 and 16 is closed at its lower part by a perforated base 17, and is coupled to a distribution space for blown air, shown respectively at 18, 19, 20 and 21. The spaces 18 and 20 are coupled by means of conduits 22, 23 to the source of hot air. The space 19 is supplied with fluid by the conduit 24, and the space 21 is connected by 25 to a source of cold air.

The supply of hot or cold air to the spaces 18 to 21 may be effected in a continuous or a pulsatory manner. The perforated base 17 may be given a vibratory movement, either alone or together with the chambers 11 to 16 by means of vibrators 54.

In each of the chambers 11 to 13 and 16, there may be arranged partitions 26, 27, 28 and 29 which do not extend as far as the bottom of the chamber. The intake of the products to be treated is made at 30 and they are evacuated at 31. The conduit 24 is coupled to a fan 32 which draws-in fluid from the chamber 10 through the piping system 33.

The products to be dried, especially grains, are brought at 30 into the chamber 11. Under the action of the hot air under pressure brought in through the conduit 22 and passing through the bottom 17, the mass of grains is "fluidised," and is set into a boiling movement in the same way as a liquid in the chamber 11. The hot air provides the beginning of the drying operation.

The level of the bed of grains at 11, supplied through the conduit 30, rises above the edge of the partition 14 and the excess quantity flows into the chamber 12 in the same way as a liquid flows over a weir. The progressive displacement of the grain is improved by the partition 26.

In the chamber 12, the grains are also fluidised by the air blown-in at 19. This air is derived in this case from the re-cycling by the fan 32 and the conduit system 33 of air drawn from the upper portion of the casing 10.

The bed of grains in the chamber 12 flows into the chamber 13 in which the mass of grains is subjected to a fluidisation and to the heat of the hot air blown-in at 20 through the conduit 23.

At the outlet of the chamber 13, the grains pass into the chamber 16 in which they are also fluidised and subjected to a cooling action by the cold air brought in at 21 through the conduit 25.

The number of the chambers and their arrangement may obviously be determined as desired. Each chamber may be provided with a supply system of air at different temperatures, with a greater or less proportion of re-cycling. In this way especially, the spaces 18 and 20 may be coupled to the space 19 which receives the re-cycled air through the conduits 51, 52 which are provided with regulating means 53. As can be seen, the grains travel in the horizontal direction, becoming heated up progressively, and are subjected in each chamber and in a fluidised state to the conditions appropriate to their temperature and to their degree of dryness. In this way, especially, the chamber 11 which receives the grains which are most humid, although cold, can receive hot air, whilst in the chambers 12 and 13 the injection is carried out with air the temperature of which is progressively increased (methodical heating).

On the piping system 33 or connected in parallel on the space 19, there may be mounted a fan (not shown) which provides for the evacuation of dust.

A similar installation (see Fig. 2), although simpler, provides for the torrefaction or sterilization of grains or other products. It comprises a chamber 34 with a perforated bottom 35, divided into smaller chambers 36, 37, 38 and a space 39 supplied with hot air or gas supplied under pressure by the fan 40. The suction side of the fan is coupled by the conduit 41 to the top of the chamber 34. On the conduit 41 is connected a heater 42 and the admission of the products to be treated is effected at 43. The treated products are discharged at 44.

This installation operates in the same way as that shown in Fig. 1. The hot fluid blown through the bottom 35 puts the grains in a state of fluidisation and, at the same time, heats them. In this case, the hot fluid circulates in a closed circuit which is made possible since its hygromatic degree remains constant.

In Fig. 3, there is shown an apparatus for cooking by steam. This comprises a chamber 45 with a perforated base 46. The chamber 45 is connected at its base with a steam-admission pipe 47 provided with a valve 48. The chamber is also provided with a valve 49 at its upper portion.

In order to effect the cooking of the grains, it is only necessary to maintain them in a humid atmosphere at a suitable temperature. The method in accordance with the invention lends itself particularly well to this operation. The products to be cooked being arranged on the bottom 46, saturated or superheated steam is admitted at 47 at a pressure greater than that which corresponds to the temperature required for cooking, the excess of pressure corresponding to the energy expended in keeping the bed of products in the fluidized state.

It happens however that during its passage through the bottom 46 and through the fluidised bed of products, the steam expands and this expansion produces a condensation which humidifies the steam and thus also the atmosphere which surrounds the products during the cooking process.

This expansion may be regulated by means of the valve 48. The variation of the pressure and thus of the temperature in the chamber 45 is carried out by a suitable calibration of the valve 49. Any excess of condensed water which may arise will be evacuated by means of a drain-cock.

In the case in which the cooking and the simultaneous fluidisation is carried out by means of superheated steam, the humidification of the steam in contact with the products treated may be regulated by an addition of water or of expanded saturated steam.

If the rate of flow of steam necessary for the production of the state of fluidisation of the products is greater than that required for the cooking process, the excess quantity of steam is taken off in the chamber 45 and is returned by a pump 50 into the admission piping system 47.

The arrangements described and shown have of course, not a limiting character, and any alternative method of construction may be contemplated without thereby departing from the scope of the present patent.

What I claim is:

1. A continuous drying apparatus for cereals comprising a plurality of contiguous rectangular compartments in communication at their upper parts, each compartment having a perforated bottom, vertical partitions in each compartment, the said partitions extending beyond the level of communication of the contiguous compartments and being spaced a considerable distance from the perforated bottom, a separate air supply chamber communicating with each perforated bottom, means supplying hot air to said chambers, a fan connected to one of said chambers and ducts interconnecting said chambers, a casing surmounting the contiguous compartments preventing the exhaustion of the hot air to the atmosphere, a conduit connecting the said casing to the suction side of said fan for recycling the hot air through the compartments, means for admitting raw cereals into one of the said compartments through said casing, outlet means for the dried cereals extending from the last one of the compartments, and means for imparting vibrations to the said compartments, whereby the cereals pass continuously from one compartment to the next adjacent compartment by fluidization and travel in a horizontal direction.

2. A drying apparatus as set forth in claim 1, including a further compartment outside the casing for receiving the cereals from the last compartment within the casing, and means for admitting cold air through the bottom of said further compartment for cooling the cereals.

References Cited in the file of this patent

UNITED STATES PATENTS

| | | |
|---|---|---|
| 2,212,120 | Kneale et al. | Aug. 20, 1940 |
| 2,245,881 | Vissac | June 17, 1941 |
| 2,365,890 | McBean | Dec. 26, 1944 |
| 2,497,501 | Himmel et al. | Feb. 14, 1950 |
| 2,502,953 | Jahnig | Apr. 4, 1950 |
| 2,627,838 | Huggins | Feb. 10, 1953 |
| 2,629,938 | Montgomery | Mar. 3, 1953 |

FOREIGN PATENTS

| | | |
|---|---|---|
| 606,426 | Germany | Dec. 1, 1934 |
| 623,690 | Germany | Dec. 31, 1935 |